United States Patent
Yamazaki et al.

(10) Patent No.: US 7,661,507 B2
(45) Date of Patent: Feb. 16, 2010

(54) CONTROL METHOD FOR A REACTION FORCE DEVICE IN A POWER STEERING DEVICE

(75) Inventors: Norio Yamazaki, Wako (JP);
Yoshimichi Kawamoto, Wako (JP);
Shigenori Takimoto, Wako (JP);
Masato Yuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 365 days.

(21) Appl. No.: 11/358,645

(22) Filed: Feb. 21, 2006

(65) Prior Publication Data

US 2006/0185928 A1 Aug. 24, 2006

(30) Foreign Application Priority Data

Feb. 22, 2005 (JP) ............................. 2005-045302

(51) Int. Cl.
*B62D 5/06* (2006.01)
(52) U.S. Cl. ........................................ 180/446; 701/42
(58) Field of Classification Search ................ 180/443, 180/446; 701/41, 42, 43, 44
See application file for complete search history.

(56) References Cited

U.S. PATENT DOCUMENTS

| | | | |
|---|---|---|---|
| 5,072,803 A | 12/1991 | Kilian et al. | |
| 5,328,256 A * | 7/1994 | Ohta et al. | 303/146 |
| 5,845,222 A * | 12/1998 | Yamamoto et al. | 701/41 |
| 5,991,675 A * | 11/1999 | Asanuma | 701/41 |
| 6,505,704 B2 * | 1/2003 | Kim et al. | 180/446 |
| 7,027,920 B2 * | 4/2006 | Madau | 701/301 |
| 7,099,760 B2 * | 8/2006 | Lin et al. | 701/41 |
| 7,168,769 B2 * | 1/2007 | Nihei et al. | 303/140 |
| 7,302,328 B2 * | 11/2007 | Kato et al. | 701/41 |
| 7,359,787 B2 * | 4/2008 | Ono et al. | 701/82 |
| 2006/0129293 A1 | 6/2006 | Bernzen et al. | |

FOREIGN PATENT DOCUMENTS

| | | |
|---|---|---|
| DE | 39 22 527 | 5/1992 |
| DE | 195 36 989 | 4/1996 |
| DE | 102 60 752 | 7/2004 |
| JP | 3176900 | 4/2001 |
| JP | 2007118676 A * | 5/2007 |
| WO | 2004/012976 | 2/2004 |

* cited by examiner

*Primary Examiner*—Kevin Hurley
(74) *Attorney, Agent, or Firm*—Rankin, Hill & Clark LLP

(57) ABSTRACT

In a control method for a motor 10 for generating a reaction force when a driver operates a steering wheel, as a behavior of a vehicle increases, a larger reaction force to the behavior is generated. When an anti-lock brake system is operated, the reaction force to the behavior is corrected so as to be large.

16 Claims, 4 Drawing Sheets

CONTROL METHOD FOR A REACTION FORCE DEVICE IN A POWER STEERING DEVICE

BACKGROUND OF THE INVENTION

The present invention relates to a control method for a reaction force device for generating a reaction force when a driver operates an operating member.

Some of electric steering devices for reducing the steering force of a driver have reaction force devices for generating an auxiliary reaction force to improve a deflection suppressing performance of a vehicle when a disturbance such as transverse wind acts on the vehicle (for instance, see patent Document 1).

A usual reaction force device judges the behavior of the vehicle from a yaw rate and determines the auxiliary reaction force in accordance with a yaw rate value. [Patent Document 1] Japanese Patent No. 3176900

On some of the vehicles, various kinds of support systems are mounted including an anti-lock brake system (abbreviate it as an ABS, hereinafter) for preventing wheels of the vehicle from being locked during a quick brake under a condition of a slippery road surface such as a snow road, a brake system for reducing a clash from behind that anticipates the possibility of a collision of a self-vehicle to automatically operate a brake so as to avoid the collision, a traction control system (abbreviate it as a TCS, hereinafter) that prevents an excessive slip of driving wheels liable to occur during a start or acceleration under the state of a slippery road surface such as a snow road by automatically controlling an engine output or an electronically controlled front and rear brake distributor for optimally distributing front and rear brake force by controlling the brake pressure of rear wheels.

However, usually, the deciding processes of the operation of each of the various kinds of support systems and the auxiliary reaction force by the reaction force device are respectively independently controlled. Accordingly, when each of the support systems is operated, an optimum auxiliary reaction force for improving the deflection suppressing performance of the vehicle is hardly determined.

SUMMARY OF THE INVENTION

Thus, it is an object of the present invention to provide a control method for a reaction force device in which a deflection suppressing performance of a vehicle can be enhanced and a traveling stability can be enhanced even under a state of the vehicle when each of various kinds of support systems is operated.

In order to solve the above-described problems, the invention defined in aspect 1 provides a control method for a reaction force device (for instance, a motor 10 in a below-described embodiment) for generating a reaction force when a driver operates an operating member (for instance, a steering wheel 3 in the below-described embodiment). In the control method, as a behavior of a vehicle is increased, a larger reaction force to the behavior is generated, and when a brake is automatically operated by anticipating the possibility of a collision, the reaction force to the behavior is corrected so as to increase.

According to such a structure, when the brake is automatically operated by anticipating the possibility of the collision, the reaction force to the behavior operating on the operating member can be increased more than that when the brake is not operated and the deflection suppressing performance of the vehicle can be improved.

The invention defined in aspect 2 provides a control method for a reaction force device (for instance, a motor 10 in a below-described embodiment) for generating a reaction force when a driver operates an operating member (for instance, a steering wheel 3 in the below-described embodiment) characterized in that as a behavior of a vehicle is increased, a larger reaction force to the behavior is generated, and when an anti-lock brake system is operated, the reaction force to the behavior is corrected so as to increase.

According to such a structure, when the anti-lock brake system is operated, the reaction force to the behavior operating on the operating member can be increased more than that when the system is not operated and the deflection suppressing performance of the vehicle can be improved.

The invention defined in aspect 3 provides a control method for a reaction force device (for instance, a motor 10 in a below-described embodiment) for generating a reaction force when a driver operates an operating member (for instance, a steering wheel 3 in the below-described embodiment) characterized in that as a behavior of a vehicle is increased, a larger reaction force to the behavior is generated, and when a traction control system is operated, the reaction force to the behavior is corrected so as to increase.

According to such a structure, when the traction control system is operated, the reaction force to the behavior operating on the operating member can be increased more than that when the system is not operated and the deflection suppressing performance of the vehicle can be improved.

The invention defined in aspect 4 provides a control method for a reaction force device (for instance, a motor 10 in a below-described embodiment) for generating a reaction force when a driver operates an operating member (for instance, a steering wheel 3 in the below-described embodiment) characterized in that as a behavior of a vehicle is increased, a larger reaction force to the behavior is generated, and when an electronically controlled front and rear brake distributor for automatically distributing the brake force of front and rear wheels is operated by controlling the brake pressure of the rear wheel, the reaction force to the behavior is corrected so as to increase.

According to such a structure, when the electronically controlled front and rear brake distributor is operated, the reaction force to the behavior operating on the operating member can be increased more than that when the device is not operated and the deflection suppressing performance of the vehicle can be improved.

According to the invention set forth in aspect 1, when the possibility of the collision is expected to automatically operate the brake, the traveling stability of the vehicle can be improved.

According to the invention set forth in aspect 2, when the anti-lock brake system is operated, the traveling stability of the vehicle can be improved.

According to the invention set forth in aspect 3, when the traction control system is operated, the traveling stability of the vehicle can be improved.

According to the invention set forth in aspect 4, when the electronically controlled front and rear brake distributor is operated, the traveling stability of the vehicle can be improved.

DETAILED DESCRIPTION OF THE PREFERRED EMBODIMENTS

Now, an embodiment of a control method for a reaction force device according to the present invention will be described below by referring to FIGS. 1 to 4. In the below-described embodiment, the present invention is described in a form applied to an electric power steering device of a vehicle.

Figure 1:
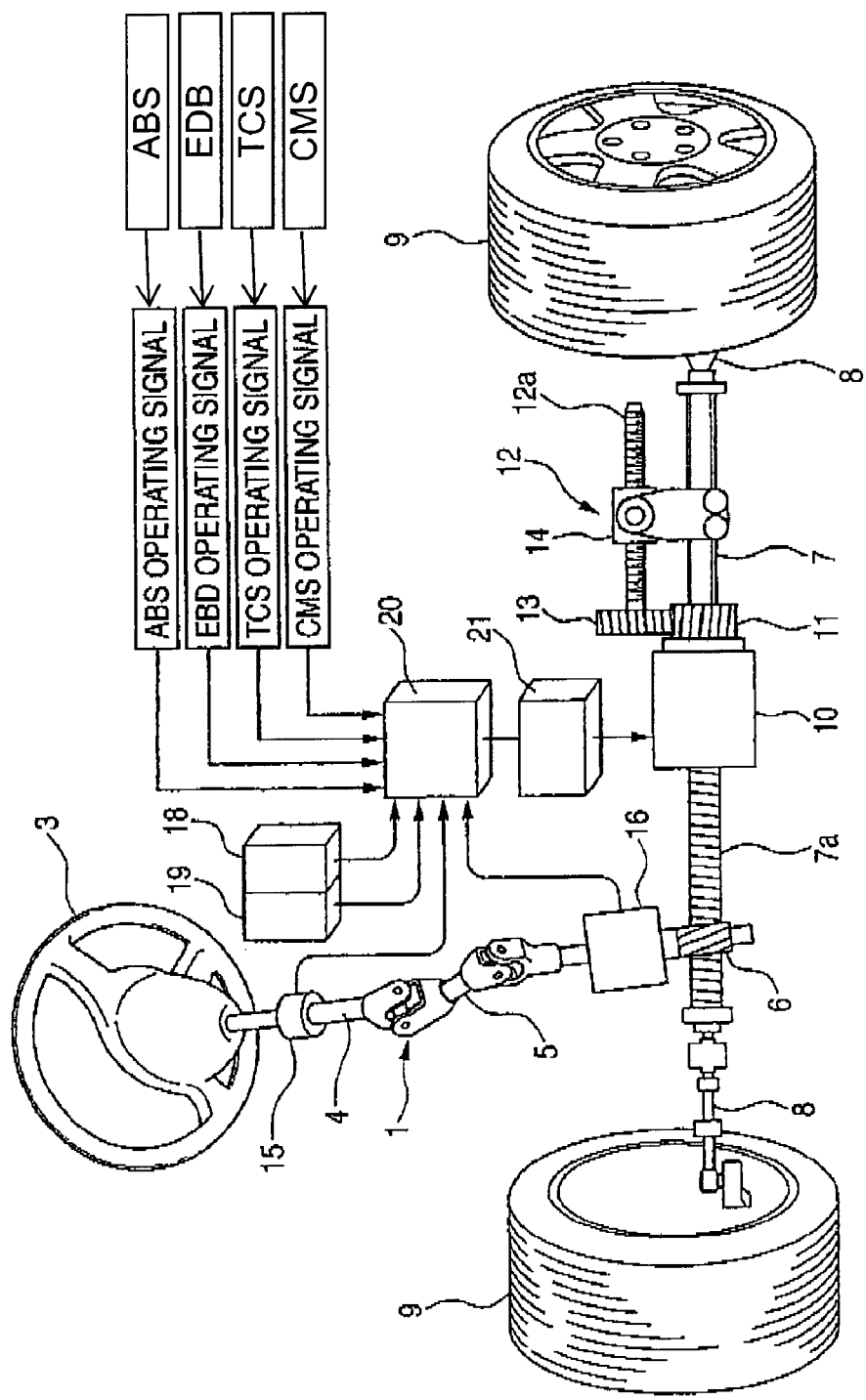
FIG. 1 is a block diagram of an electric power steering device preferably suitable for embodying a control method for a reaction force device according to the present invention.

Initially, the structure of the electric power steering device will be described by referring to FIG. 1. The electric power steering device includes a manual steering force generating mechanism 1. In the manual steering force generating mechanism 1, a steering shaft 4 connected integrally with a steering wheel (operating member) 3 is connected to a pinion 6 of a rack and pinion mechanism through a connecting shaft 5 having a universal joint. The pinion 6 engages with a rack 7a of a rack shaft 7 that can reciprocate in the direction of width of the vehicle. To both the ends of the rack shaft 7, right and left front wheels 9 and 9 as rolling and steering wheels are connected through tie rods 8 and 8. According to this structure, when the steering wheel 3 is steered, an ordinary rack and pinion type rolling and steering operation can be carried out. The front wheels 9 and 9 can be rolled and steered to turn the vehicle. The rack shaft 7 and the tie rods 8 and 8 form a rolling and steering mechanism.

On the same shaft as the rack shaft 7, a motor 10 is disposed for supplying an auxiliary steering force for reducing a steering force by the manual steering force generating mechanism 1. The auxiliary steering force supplied by the motor 10 is converted to a thrust through a ball screw mechanism 12 provided in substantially parallel with the rack shaft 7 to exert the thrust on the rack shaft 7. Accordingly, a driving side helical gear 11 is provided integrally with a rotor of the motor 10 inserted to the rack shaft 7 and a driven side helical gear 13 engaging with the driving side helical gear 11 is provided at one end of a screw shaft 12a of the ball screw mechanism 12. A nut 14 of the ball screw mechanism 12 is fixed to the rack 7.

In the steering shaft 4, a steering angular velocity sensor (a steering speed detecting unit) 15 is provided for detecting the steering angular velocity (steering speed) of the steering shaft 4. In a steering gear box (an illustration is omitted) for accommodating the rack and pinion mechanism (6, 7a), a steering torque sensor (a steering torque detecting unit) 16 is provided for detecting a steering torque operating on the pinion 6. The steering angular velocity sensor 15 outputs an electric signal corresponding to the detected steering angular velocity to a steering controller 20, and the steering torque sensor 16 outputs an electric signal corresponding to the detected steering torque to the steering controller 20, respectively.

Further, to suitable parts of a vehicle body, a yaw rate sensor (a yaw rate detecting unit) 18 for detecting the yaw rate of the vehicle and a vehicle body speed sensor 19 for detecting vehicle body speed are attached. The yaw rate sensor 18 outputs an electric signal corresponding to the detected yaw rate to the steering controller 20, and the vehicle body speed sensor 19 outputs an electric signal corresponding to the detected vehicle body speed to the steering controller 20, respectively.

Further, the vehicle is equipped with an anti-lock brake system (abbreviate it as an ABS, hereinafter) for preventing wheels of the vehicle from being locked during a quick brake under a condition of a slippery road surface such as a snow road, a brake system for reducing a clash from behind (abbreviate it as a CMS, hereinafter) that anticipates the possibility of a collision of a self-vehicle to automatically operate a brake so as to avoid the collision, a traction control system (abbreviate it as a TCS, hereinafter) that prevents an excessive slip of driving wheels liable to occur during a start or acceleration under the state of a slippery road surface such as a snow road by automatically controlling an engine output and an electronically controlled front and rear brake distributor (abbreviate it as an EBD, hereinafter) for optimally distributing front and rear brake force by controlling the brake pressure of rear wheels. To the steering controller 20, an ABS operating signal showing the operating state of the ABS, a CMS operating signal showing the operating state of the CMS, a TCS operating signal showing the operating state of the TCS and an EBD operating signal showing the operating state of the EBD are respectively inputted.

Then, the steering controller 20 determines a target current to be supplied to the motor 10 by a control signal obtained by processing input signals from these sensors 15, 16, 18 and 19 and the ABS operating signal, the CMS operating signal, the TCS operating signal and the EBD operating signal and supplies the target current to the motor 10 through a driving circuit 21 to control the output torque of the motor 10 and an auxiliary steering force in a steering operation.

Figure 2:
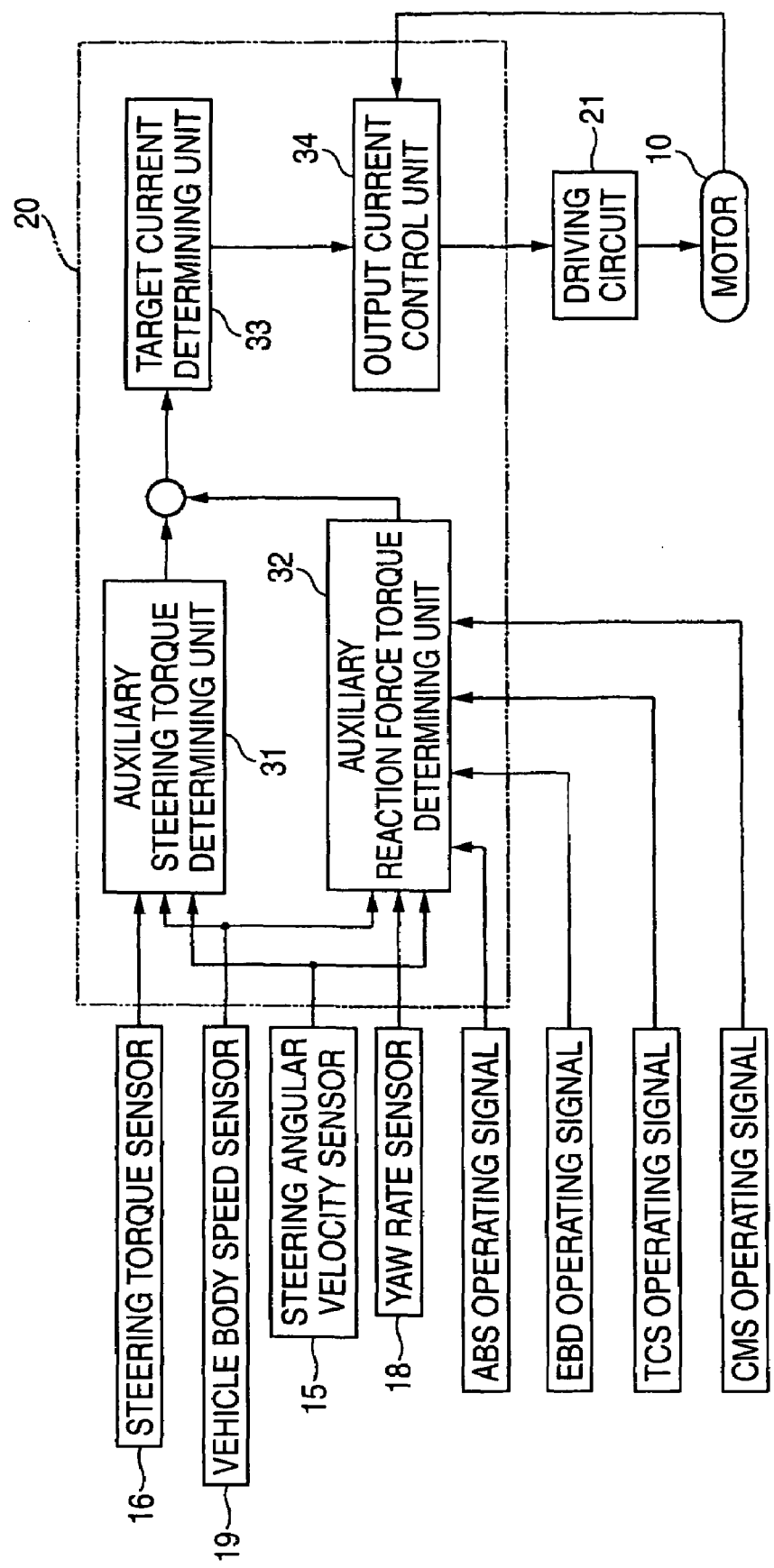
FIG. 2 is a block diagram of an output torque control of a motor in the electric power steering device.

Now, with reference to a control block diagram shown in FIG. 2, an output torque control of the motor 10 in this embodiment will be described below.

The steering controller 20 includes an auxiliary steering torque determining unit 31, an auxiliary reaction force torque determining unit (reaction force device) 32, a target current determining unit 33 and an output current control unit 34.

The auxiliary steering torque determining unit 31 determines an auxiliary steering torque on the basis of the output signals from the steering angular velocity sensor 15, the steering torque sensor 16 and the vehicle body speed sensor 19. Since a determining method of the auxiliary steering torque in the auxiliary steering torque determining unit 31 is the same as that of a well-known electric power steering, a detailed description thereof is omitted. Generally speaking, as the steering angular velocity increases, the auxiliary steering torque is set to be smaller, as the steering torque increases, the auxiliary steering torque is set to be larger and as the vehicle body speed increases, the auxiliary steering torque is set to be smaller.

The auxiliary reaction force torque determining unit 32 determines an auxiliary reaction force torque TA on the basis of the output signals of the steering angular velocity sensor 15, the yaw rate sensor 18 and the vehicle body speed sensor 19, respectively and the ABS operating signal, the EBD operating signal, the TCS operating signal and the CMS operating signal. A determining process of the auxiliary reaction force torque TA will be described below in detail.

The target current determining unit 33 subtracts the auxiliary reaction force torque determined by the auxiliary reaction force torque determining unit 32 from the auxiliary steering torque determined by the auxiliary steering torque determining unit 31 to calculate a target output torque of the motor 10 and determines a target current corresponding to the target output torque in accordance with the already known output characteristics of the motor 10.

The output current control unit 34 controls an output current to the motor 10 so that an actual current of the motor 10 corresponds to the target current determined by the target current determining unit 33 and outputs the output current to the driving circuit 21.

As described above, in this embodiment, the auxiliary reaction force torque is subtracted from the auxiliary steering torque to determine the target output torque of the motor 10 and the motor 10 is operated to obtain the target output torque. Accordingly, it may be the that the motor 10 not only serves as a steering assist device for generating an assist force when a driver operates an operating member, but also serves as a reaction force device for generating a reaction force when the driver operates the operating member.

Figure 3:
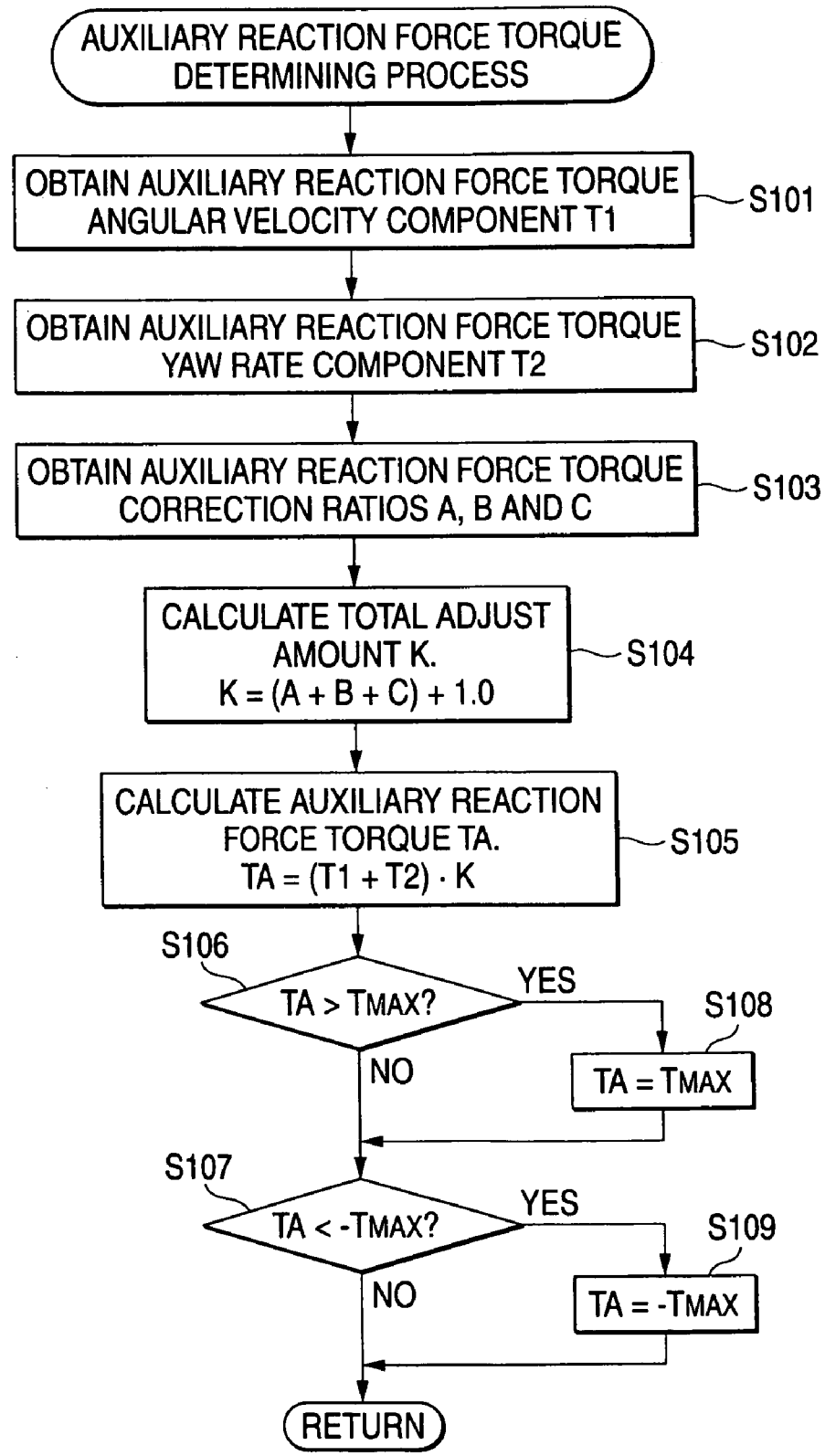
FIG. 3 is a flowchart showing an auxiliary reaction force torque determining process in the output torque control of the motor.
Figure 4:
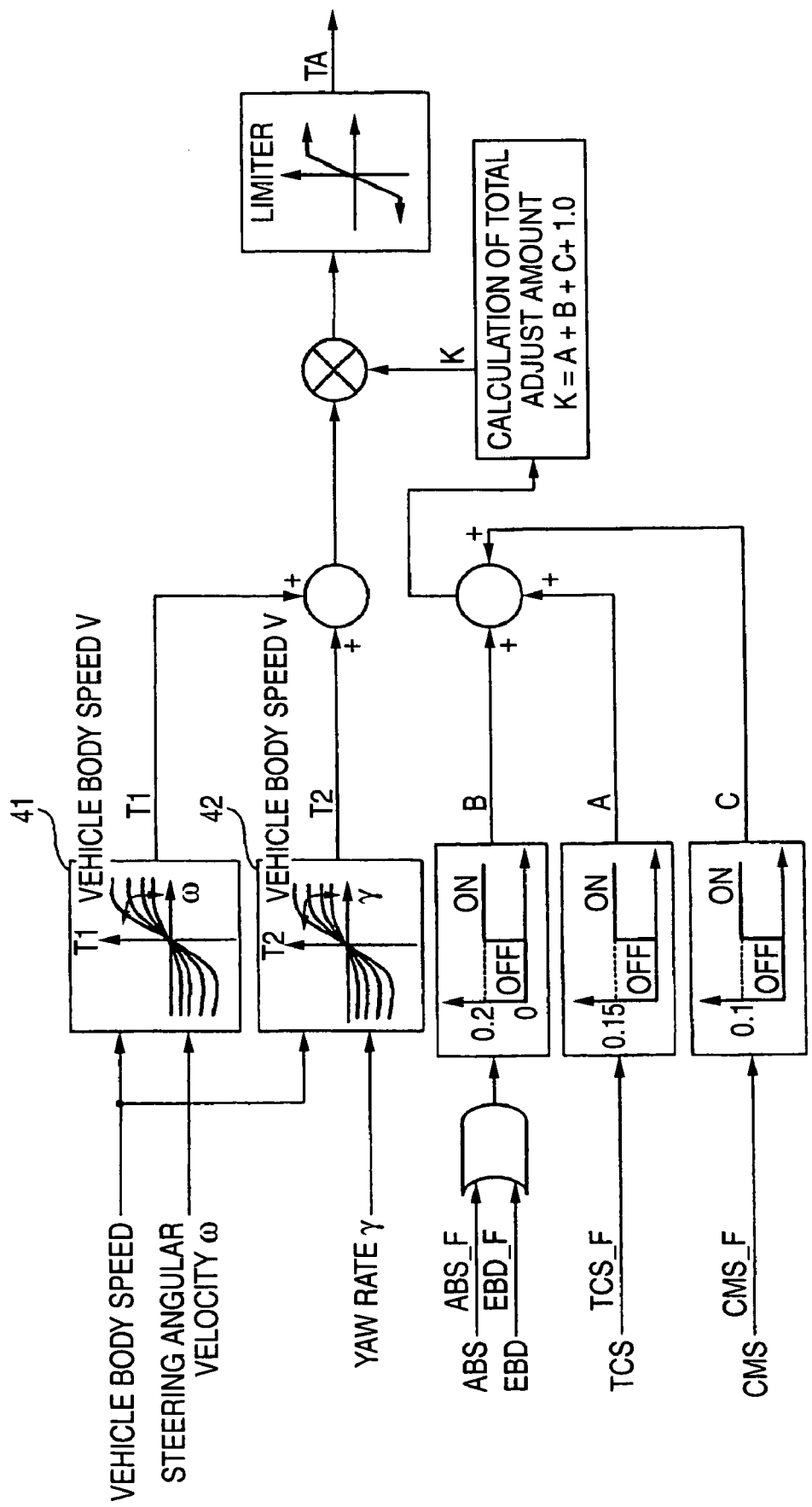
FIG. 4 is a block diagram of the auxiliary reaction force torque determining process.

Subsequently, an auxiliary reaction force torque determining process performed in the auxiliary reaction force torque determining unit 32 will be described below in accordance with a flowchart shown in FIG. 3 and a block diagram shown in FIG. 4. An auxiliary reaction force torque determining process routine shown in the flowchart of FIG. 3 is repeatedly carried out at intervals of prescribed time by the steering controller 20.

Initially, by referring to a first auxiliary reaction force torque table 41 shown in FIG. 4 in step S101, an auxiliary reaction force torque (refer it to as an auxiliary reaction force torque angular velocity component, hereinafter) T1 related to steering angular velocity ω is obtained in accordance with the output signals of the steering angular velocity sensor 15 and the vehicle body speed sensor 19 respectively. The first auxiliary reaction force torque table 41 includes a table having as an address the steering angular velocity ω set for each vehicle body speed V. As the steering angular velocity ω increases, the auxiliary reaction force torque angular velocity component T1 is so set as to be larger, and as the vehicle body speed V increases, the auxiliary reaction force torque angular velocity component T1 is so set as to be larger.

Then, the procedure advances to step S102 to obtain an auxiliary reaction force torque (refer it to as an auxiliary reaction force torque yaw rate component, hereinafter) T2 related to a yaw rate γ in accordance with the output signals of the yaw rate sensor 18 and the vehicle body speed sensor 19 respectively by referring to a second auxiliary reaction force torque table 42 shown in FIG. 4. The second auxiliary reaction force torque table 42 includes a table having as an address the yaw rate γ set for each vehicle body speed V. As the yaw rate γ increases, the auxiliary reaction force torque yaw rate component T2 is so set as to be larger, and as the vehicle body speed V increases, the auxiliary reaction force torque yaw rate component T2 is so set as to be larger.

That is, in this embodiment, the yaw rate γ is employed as a parameter of the behavior of the vehicle. As the yaw rate γ increases, in other words, as the behavior of the vehicle is increased, the auxiliary reaction force torque (a reaction force to the behavior) T2 is so set as to be larger.

Then, the procedure advances to step S103 to obtain auxiliary reaction force torque correction ratios A, B and C respectively corresponding to the operating states of the TCS operating signal, the ABS operating signal, the EBD operating signal and the CMS operating signal.

Specifically stated, the auxiliary reaction force torque correction ratio A set in accordance with the TCS operating signal is set on the basis of a TCS flag (TCS-F) showing whether the TCS is in an operating state (ON) or in a non-operative state (OFF). When the TCS flag is in a state of ON, the auxiliary reaction force torque correction ratio A is set to a prescribed constant value (for instance, A=0.15). When the TCS flag is in a state of OFF, the auxiliary reaction force torque correction ratio A is set to zero (A=0).

The auxiliary reaction force torque correction ratio B set in accordance with the ABS operating signal and the EBD operating signal is set on the basis of an ABS flag (ABS-F) showing whether the ABS is in an operating state (ON) or in a non-operative state (OFF) and an EBD flag (EBD-F) showing whether the EBD is in an operating state (ON) or in a non-operative state (OFF). When at least one of the ABS flag and the EBD flag is in a state of ON, the auxiliary reaction force torque correction ratio B is set to a prescribed constant value (for instance, B=0.2). When both the ABS flag and the EBD flag are in a state of OFF, the auxiliary reaction force torque correction ratio B is set to zero (B=0).

The auxiliary reaction force torque correction ratio C set in accordance with the CMS operating signal is set on the basis of a CMS flag (CMS-F) showing whether the CMS is in a operating state (ON) or in a non-operative state (OFF). When the CMS flag is in a state of ON, the auxiliary reaction force torque correction ratio C is set to a prescribed constant value (for instance, C=0.1). When the CMS flag is in a state of OFF, the auxiliary reaction force torque correction ratio C is set to zero (C=0).

Then, the procedure advances to step S104 to calculate a total adjust amount K from the auxiliary reaction force torque correction ratios A, B and C obtained in the step S103 in accordance with a following formula (1).

$$K = (A+B+C)+1.0 \ldots \quad (1)$$

Then, the procedure advances to step S105 to calculate the auxiliary reaction force torque TA from the auxiliary reaction force torque angular velocity component T1 obtained in the step S101, the auxiliary reaction force torque yaw rate component T2 obtained in the step S102 and the total adjust amount K obtained in the step S104 in accordance with a following formula (2).

$$TA = (T1+T2)K \ldots \quad (2)$$

When the auxiliary reaction force torque TA is calculated in such a way, if the ABS, the EBD, the TCS and the CMS do not operate, the total adjust amount K is equal to 1.0. Accordingly, the auxiliary reaction force torque TA is equal to the sum (T1+T2) of the auxiliary reaction force torque angular velocity component T1 and the auxiliary reaction force torque yaw rate component T2. When any of the ABS, the EBD, the TCS and the CMS operates, since the total adjust amount K is not smaller than 1, the auxiliary reaction force torque TA is larger than "T1+T2".

Subsequently, the procedure advances to step S106 to decide whether or not the auxiliary reaction force torque TA calculated in the step S105 is larger than an auxiliary reaction force torque maximum value Tmax. When a decided result in the step S106 is "NO" (TA≦Tmax), the procedure advances to step S107. When the decided result in the step S106 is "YES" (TA>Tmax), the procedure advances to step S108 to make the auxiliary reaction force torque maximum value Tmax equal to the auxiliary reaction force torque TA and move to the step S107. That is, a process of the step S107 functions as a limiter for preventing the auxiliary reaction force torque TA from exceeding the auxiliary reaction force torque maximum value Tmax.

In the step S107, it is decided whether or not the auxiliary reaction force torque TA calculated in the step S105 is smaller than an auxiliary reaction force torque minimum value -Tmax. When a decided result is "NO" (TA≧-Tmax) in the step S107, the execution of a main routine is temporarily finished. When the decided result in the step S107 is "YES" (TA<-Tmax), the procedure advances to step S109 to make the auxiliary reaction force torque minimum value -Tmax equal to the auxiliary reaction force torque TA and temporarily finish the execution of the main routine. That is, the process of the step S109 functions as a limiter for preventing the auxiliary reaction force torque TA from being smaller than the auxiliary reaction force torque minimum value -Tmax.

When the auxiliary reaction force torque TA is determined as described above, below-described operational effects can be obtained.

When the TCS operates, there is a high possibility that a road is a low μ road in which a coefficient of friction between a tire and a road surface is small, so that the behavior of the vehicle is apt to be unstable. However, if the auxiliary reaction force torque TA is determined as in this embodiment, when the TCS operates, the auxiliary reaction force torque TA can be increased more than that when the TCS does not operate and a deflection suppressing performance of the vehicle can be improved. Accordingly, when the TCS operates, the traveling stability of the vehicle can be improved.

When the ABS operates, there is a high possibility that a road is a low μ road in which a coefficient of friction between a tire and a road surface is small, so that the behavior of the vehicle is liable to be unstable. However, if the auxiliary reaction force torque TA is determined as in this embodiment, when the ABS operates, the auxiliary reaction force torque TA can be increased more than that when the ABS does not operate and a deflection suppressing performance of the vehicle can be improved. Accordingly, when the ABS operates, the traveling stability of the vehicle can be improved.

When the EBD operates, rear wheels tend to slip and the transverse force of a tire is possibly lowered and the behavior of the vehicle is apt to be unstable. However, if the auxiliary reaction force torque TA is determined as in this embodiment, when the EBD operates, the auxiliary reaction force torque TA can be increased more than that when the EBD does not operate and a deflection suppressing performance of the vehicle can be improved. Accordingly, when the EBD operates, the traveling stability of the vehicle can be improved.

When the CMS operates, the possibility of a collision is anticipated to automatically operate a brake, so that the behavior of the vehicle is apt to be unstable. However, if the auxiliary reaction force torque TA is determined as in this embodiment, when the CMS operates, the auxiliary reaction force torque TA can be increased more than that when the CMS does not operate and a deflection suppressing performance of the vehicle can be improved. Accordingly, when the CMS operates, the traveling stability of the vehicle can be improved.

Other Embodiments

The present invention is not limited to the above-described embodiment.

For instance, in the above-described embodiment, the vehicle including all the ABS, the EBD, the TCS and the CMS is explained. However, the present invention may be applied to a vehicle having at least one of the ABS, the EBD, the TCS and the CMS.

In the auxiliary reaction force torque correction ratios A, B and C in the above-described embodiment, one example is merely described about numeric values thereof or a large-small relation between them. Other numeric values including the large-small relation may be employed.

The control method for a reaction force device according to the present invention is not limited to the electric power steering device of the above-described embodiment and may be applied to a steering device of a steer by wire system (SBW). The SBW is a steering system that has an operating member mechanically separated from a rolling and steering mechanism and includes a reaction force motor (a reaction force device) for allowing a reaction force to act on the operating member and a steering motor provided in the rolling and steering mechanism for generating a force for rolling and steering rolling and steering wheels.

What is claimed is:

1. A control method for a reaction force device, said reaction force device generating and applying a reaction force that acts on a vehicle steering device in response to a vehicle behavior when a driver operates the vehicle steering device, the control method comprising the steps of:
   detecting a yaw rate of the vehicle;
   generating a first reaction force to act on the vehicle steering device based on the detected vehicle yaw rate, wherein the first reaction force increases as the detected vehicle yaw rate increases;
   applying the first reaction force to the vehicle steering device;
   correcting the first reaction force by increasing the first reaction force when an anti-lock brake system is operated; and
   applying the corrected first reaction force to the vehicle steering device.

2. The control method according to claim 1, wherein the first reaction force is generated and applied prior to the operation of the antilock brake system.

3. A control method for a reaction force device, said reaction force device generating and applying a reaction force that acts on a vehicle steering device in response to a vehicle behavior when a driver operates the vehicle steering device, the control method comprising the steps of:
   detecting a yaw rate of the vehicle;
   generating a first reaction force to act on the vehicle steering device based on the detected vehicle yaw rate, wherein the first reaction force increases as the detected vehicle yaw rate increases;
   applying the first reaction force to the vehicle steering device;
   correcting the first reaction force by increasing the first reaction force when a system is operated; and
   applying the corrected reaction force to the vehicle steering device.

4. The control method according to claim 3, wherein the first reaction force is corrected when a traction control system is operated.

5. The control method according to claim 3, wherein the first reaction force is corrected when a brake system is operated.

6. The control method according to claim 5, wherein the brake system is a brake that is automatically operated to avoid a collision.

7. The control method according to claim 5, wherein the brake system is an electronically controlled front and rear brake distributor for automatically distributing the brake force of front and rear wheels by controlling the brake pressure of the rear wheel.

8. The control method according to claim 3, wherein the first reaction force is generated and applied prior to the operation of the system.

9. The control method according to claim 8, wherein the first reaction force is corrected when a traction control system is operated.

10. The control method according to claim 8, wherein the first reaction force is corrected when a brake system is operated.

11. The control method according to claim 10, wherein the brake system is a brake that is automatically operated to avoid a collision.

12. The control method according to claim 10, wherein the brake system is an electronically controlled front and rear brake distributor for automatically distributing the brake force of front and rear wheels by controlling the brake pressure of the rear wheel.

13. A control method for a reaction force device, said reaction force device generating and applying a reaction force that acts on a vehicle in response to a vehicle behavior when a driver operates an operating member, the control method comprising the steps of:

detecting a vehicle yaw rate;

generating a reaction force to act on the vehicle based on the detected vehicle yaw rate, wherein the generated reaction force increases as the detected vehicle yaw rate increases, and increasing the generated reaction force in response to an operation of at least one of a brake system and a traction control system, wherein the generated reaction force is increased a first predetermined amount if only the brake system is operated, a second predetermined amount if only the traction control system is operated, and a third predetermined amount if the traction control system and brake system are both operated.

14. The control method according to claim 13, wherein the brake system includes an anti-lock brake system.

15. The control method according to claim 13, wherein the brake system includes a brake that is automatically operated to avoid a collision.

16. The control method according to claim 13, wherein the brake system is an electronically controlled front and rear brake distributor for automatically distributing a brake force at front and rear wheels by controlling a brake pressure on the rear wheel.

* * * * *